Aug. 2, 1966 E. G. FRIDRICH 3,263,852
METHOD OF GLASS BULB MANUFACTURE AND GLASS BULB
Filed May 9, 1963 2 Sheets-Sheet 1
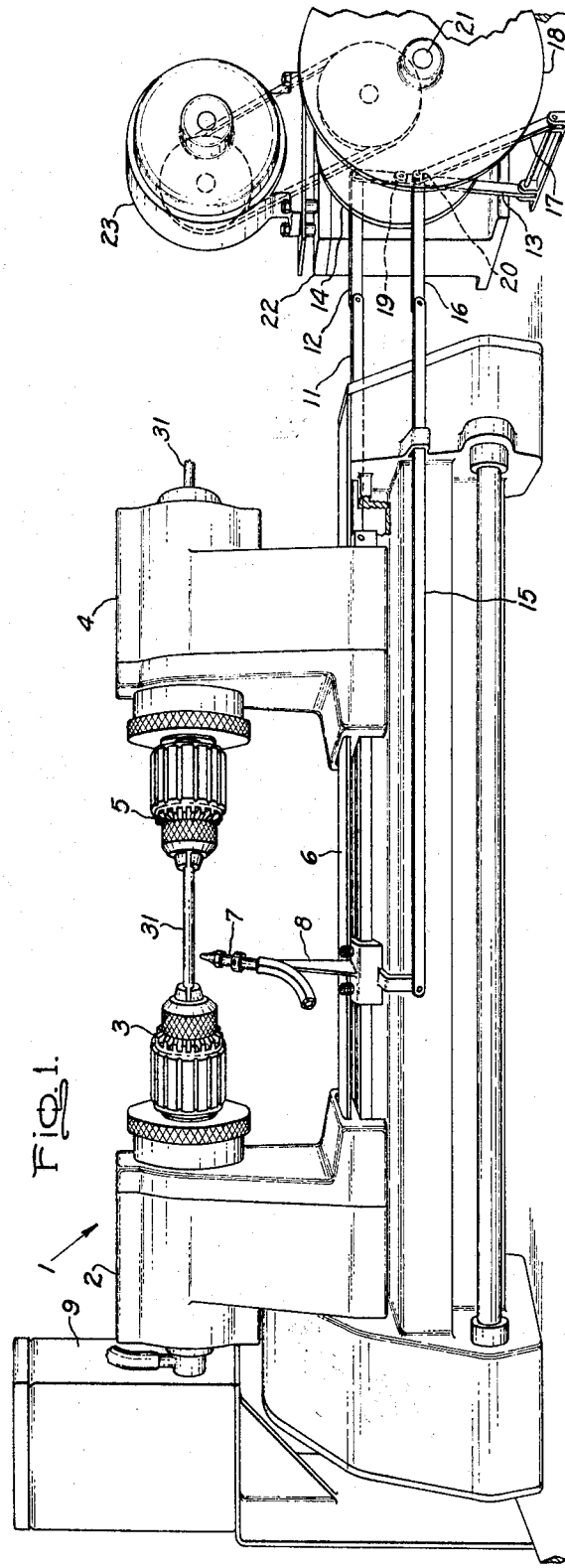
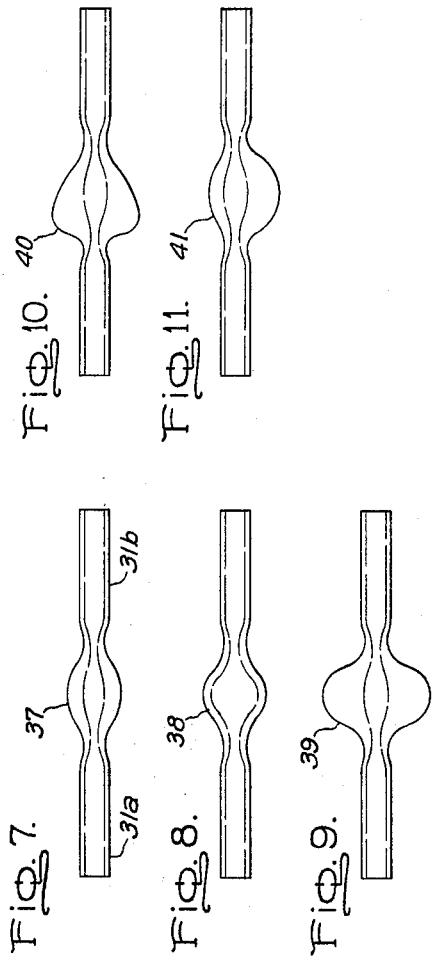
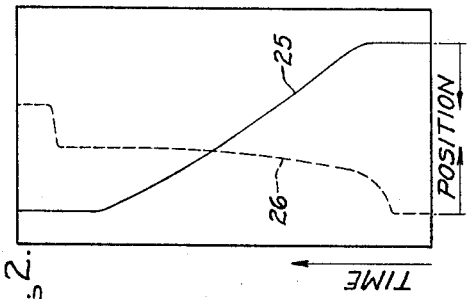
Inventor:
Elmer G. Fridrich
by Ernest W. Payne
His Attorney Aug. 2, 1966  E. G. FRIDRICH  3,263,852
METHOD OF GLASS BULB MANUFACTURE AND GLASS BULB
Filed May 9, 1963  2 Sheets-Sheet 2

Inventor:
Elmer G. Fridrich
by  Emmett W. Hagan
His Attorney

United States Patent Office 3,263,852
Patented August 2, 1966

3,263,852
METHOD OF GLASS BULB MANUFACTURE AND GLASS BULB
Elmer G. Fridrich, South Euclid, Ohio, assignor to General Electric Company, a corporation of New York
Filed May 9, 1963, Ser. No. 279,229
7 Claims. (Cl. 220—2.1)

This invention relates to new one-piece quartz bulb or envelope constructions and to a method and apparatus suitable for their manufacture. The invention is particularly applicable to quartz bulbs of relatively small size for manufacture into lamps by the tipless sealing and flush filling process described and claimed in my copending application Serial No. 279,270, filed of even date herewith, entitled "Electric Lamp Manufacture," and assigned to the same assignee as the present invention.

Quartz lamps have generally been made by pinch-sealing molybdenum foil inleads into the ends of a quartz tube of substantially uniform bore and wall thickness. Pinch-sealing involves a radical deformation of the ends of the tube, which is all the more pronounced the smaller the size of the tube or envelope. In some lamps, for instance in compact source short arc gap lamps, it is desirable to have a more spherical or differently proportioned bulb than can be achieved by pinch-sealing quartz tubing, or a bulb which is relatively thick-walled with thin-walled necks. Such envelopes may be made by butting and joining together pieces of quartz comprising a central thick-walled bulbous portion and thinner-walled tubular portions on each side to form the necks. This, however, is a laborious procedure and results in an expensive bulb. Also such bulbs frequently develop weakness at the joints and are more subject to devitrification.

An object of the invention is to provide new and improved one-piece quartz bulb constructions including a relatively thick-walled central bulb portion and relatively thin-walled neck portions.

Another object of the invention is to provide a new and improved method for forming such bulbs out of quartz tubing and to provide apparatus suitable for the practice of the method.

Briefly stated, the present invention provides one-piece quartz bulbs with attached necks by the simultaneous necking down and upset of relatively thin-walled quartz tubing. When a flame sufficiently intense to heat the quartz to plasticity is played on a section of tubing, the quartz tends to collapse or neck down by reason of surface tension. If at the same time the tubing is placed under axial compression, the quartz is upset, that is it tends to bulge out and expand radially at the plastic section. By mechanically coordinating the rate and place of necking down due to heating, with the rate of upset produced by forcing together the ends of the tubing, a bulb is formed whose wall thickness may be made much greater than that of the tubing which constitutes the necks on either side.

Among the features of bulbs produced according to the invention are better optical quality and greater resistance to devitrification than bulbs resulting from the union of quartz parts.

The process of the invention may be carried out in a glass lathe which spins the tubing on its longitudinal axis. The lathe is fitted with means for simultaneously displacing a burner and the tailstock according to a predetermined pattern. By varying the pattern, a variety of bulb configurations and cross sections may be achieved. Such bulbs, by means of lens effect, may be used to modify the radiant flux distribution of the lamp.

For further features and advantages and for a better understanding of the invention, attention is now directed to the following description of bulb configurations embodying the invention and of a preferred mode of practicing the invention along with suitable equipment therefor, to be read in conjunction with the accompanying drawings. The features of the invention believed to be novel will be more particularly pointed out in the appended claims.

In the drawings wherein like symbols denote corresponding parts throughout the several views:

FIG. 1 illustrates pictorially a glass blowing lathe provided with cam drives for displacing the burner and the tailstock in a predetermined pattern according to the invention.

FIG. 2 illustrates graphically typical time-displacement patterns for the burner and tailstock in making a bulb.

FIGS. 7 to 11 illustrate a variety of different bulb configurations or cross sections which may be obtained.

Figure 3:
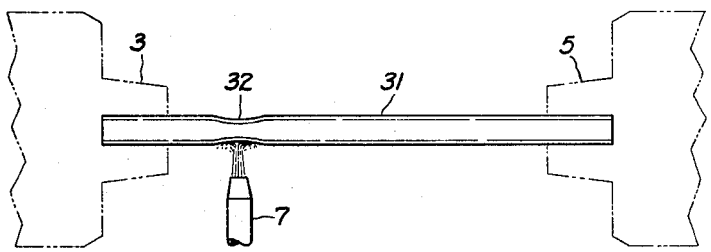
FIGS. 3 to 6 show a length of quartz tubing seized between headstock and tailstock of a glass lathe and illustrate successive stages in its processing into a bulb.
Figure 4:
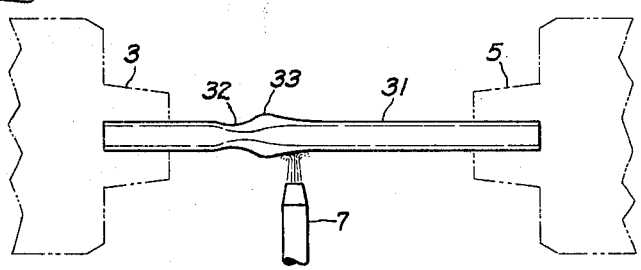
Figure 5:
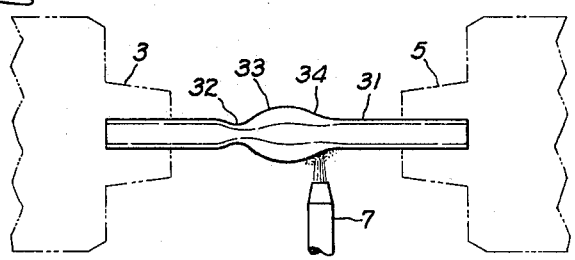

The processing of the quartz tubing into bulbs may be done in a glass blowing lathe of generally conventional construction, as pictorially illustrated in FIG. 1, provided with means for simultaneously displacing the burner and the tailstock according to a predetermined pattern. The lathe 1 comprises a headstock 2 including Jacobs chuck 3, and a tailstock 4 including Jacobs chuck 5. Both stocks are movable on the bedplate 6 but for the present purpose the headstock 2 is locked in place and only the tailstock need be movable. The lathe includes conventional drive means for rotating the head and tail chucks synchronously in unison. An oxyhydrogen burner 7 is provided for directing a hard sharp flame on the quartz tubing and is mounted on a standard 8 which is slidable on the bedplate 6. The rectangular housing 9 contains iodine vaporizing equipment which may be used in processing the bulbs into lamps according to my previously mentioned copending application.

The positions of the tailstock and burner on the bedplate are controlled by a push rod and cam system, the tailstock by push rod 11, connecting link 12, lever 13, and cam 14, and the burner by push rod 15, connecting link 16, lever 17 and cam 18. Lever 13 is provided with a roller 19 which rides in a channelway (not shown) machined in the face of cam 14 whereby the desired motion is imparted to push rod 11 as the cam goes through a revolution. In like fashion, lever 17 is provided with a roller 20 which rides in a similar channelway in the face of cam 18 to impart the desired motion to the burner. Cams 14 and 18 are fast on a common shaft 21 projecting from a gearbox 22 which is driven by an electric motor 23 through a belt and pulley coupling. The illustrated position controlling means are intended by way of example only and other means may of course be used.

FIG. 2 illustrates graphically a typical time-displacement pattern for the tailstock and the burner in processing a piece of tubing into a bulb. For the example of the process which will now be described, solid line curve 25 represents the position of the tailstock from the starting moment to completion, and dotted line curve 26 similarly represents the position of the burner. In this particular example, the tailstock and the burner move towards each other, that is their directions of displacement are opposite; it is also possible to have the tailstock and the burner displacements in the same direction as will be described subsequently. The tailstock moves to the left a distance equal to the tube shrinkage while the burner or flame moves to the right a distance equal to the finished arc chamber length.

The sequence in practicing the process will be best understood by reference to FIGS. 3 to 6. The tubing 31 is first inserted and locked in the headstock 3. Since quartz tubing is rarely perfectly straight, it may be desirable at this stage to heat up the tubing close to chuck 3 sufficiently to soften it and true it up by pressing on the free end to the extent necessary. The free end is next locked in the tailstock chuck and heat is then applied successively to both ends just enough to soften the quartz slightly and relieve any residual strain.

The burner is now positioned towards the left side of the tubing and the oxyhydrogen flame turned full on. The burner is held stationary for an interval of time corresponding to the initial vertical rise in curve 26 in FIG. 2 and the tubing gradually necks down as indicated at 32 in FIG. 3, forming the left throat. The burner is then initially displaced fairly rapidly to the right whereupon displacement of the tailstock to the left at a relatively constant rate begins, as shown by curve 25. As the tailstock moves to the left, it causes the plastic quartz to be upset and to increase in diameter as indicated at 33 in FIG. 4. Meanwhile surface tension in the quartz is tending to neck it down and reduce the internal diameter. The result is a gradual thickening of the walls which takes place smoothly and evenly so long as the motions of the tailstock and burner are smooth and regular. The heat-softened zone in which the quartz thickenes is always behind the flame, that is it is the region over which the flame has just previously passed. Thus in this example the movement of the burner is to the right and the build-up of quartz occurs to the left of the burner, as may be seen in FIGS. 4 and 5. At the stage of FIG. 5, the burner is held substantially stationary on the right flank of the quartz bulge for an interval of time after movement of the tailstock had ceased. This is in order to collapse the right flank slightly and make it correspond in curvature to the left flank of the bulge. Thereafter the burner is moved rapidly over and again held stationary for an interval of time to form the constriction or right throat as indicated at 35 in FIG. 6. The burner is now shut down to stand-by, the completed bulb is disengaged from the chucks, and any excess tubing cut off to leave the necks 31a, 31b at the desired length. It may be preferable to use tubing precut to size so that the bulb necks come out the right length.

Figure 6:
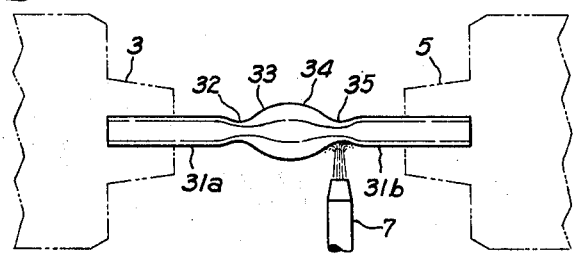

As an example of a bulb formed according to the invention as described above, a piece of quartz tubing 4″ long and having a 4 millimeter bore and 6 millimeter outer diameter was used. In processing this tubing into a bulb as illustrated in FIGS. 6 or 7, the shrinkage in length of the tubing was 1⅛ inch. The finished bulb had a chamber length of approximately 7/16 inch and a neck-to-neck distance of approximately ⅝ inch.

A characteristic feature of the one-piece quartz bulbs or envelopes according to the invention is the improvement effected in the quality of the quartz of the bulb proper. Quartz formed by drawing normally contains fine lengthwise extending cavities caused by trapped air or gases and known as "streamers." These are undesirable because they may hasten devitrification and development of a leak. In the bulbs according to the invention which are the result of build-up of quartz by simultaneous necking and upset, the cavities are converted into bubbles. This reduces the possibility of development of leaks and also means improved optical properties.

In envelopes formed by the union of parts by melting and fusing, the joints are sources of weakness where devitrification tends to originate and develop more rapidly. This is avoided in the one-piece envelopes according to the invention where the necks merge through constricted throats into the central bulb portion without joints or discontinuities.

Instead of starting the flame at the left side and displacing it towards the right as illustrated in FIGS. 3 to 6, the flame may be started on the right side and displaced towards the left. In such case, the flame must move the extent of tube shrinkage plus the finished bulb length. This means in effect that the burner movement represented by curve 26 in FIG. 2 must be reversed and added to or superimposed on the tailstock movement. With the burner moving towards the left, the quartz again builds up in the zone just previously passed over by the flame but it is now located to the right of the burner.

In forming bulbs by the method of the invention, it is important to have only a short section of quartz tubing heat-softened at one time. If heat is applied at two points simultaneously, the column in-between may go off axis; similarly, if a long section is heated, it may bend or go off axis. By heat-softening only a short section at one time, the quartz is caused to bulge out symmetrically as the tailstock is moved in and the desired bulb formation with simultaneous wall thickening takes place.

The preferable practice is to neck the tubing at one end of the proposed bulb, form the bulb, and then neck the tubing at the other end. However, this sequence is not essential. One may neck both ends and then run the burner oevr the length of quartz tubing in-between in order to thicken the walls and form the bulb. Alternatively, the bulb may be formed and then the burner moved first to one end and then to the other in order to neck down the tubing and form the throats.

Bulb 37 in FIG. 7 which is relatively thick walled and has an elongated discharge chamber illustrates generally the shape or cross section most readily formed by the process of the invention. I have found this shape particularly suitable for use in metal iodide arc lamps. Where a more spherical bulb is desired and a lesser wall thickness is sufficient, a bulb configuration such as illustrated at 38 in FIG. 8 may be obtained by blowing out the bulb of FIG. 7. This is done by heat softening the bulb in the glass lathe with an oxyhydrogen flame and applying a puff of air under pressure to one neck while blocking the other. When the bulb is blown out in this fashion, the wall thickness is reduced. Such bulbs are suitable for use in short arc gap high pressure mercury or xenon discharge lamps.

The bulb shape illustrated in FIG. 7, which may be referred to as the normal shape, tends to radiate equally in all directions except for the obstructions presented by the necks in the polar zones along the bulb axis. For some applications, an increase in radiant flux density at right angles to the axis or in the equatorial zone is desirable. In accordance with my invention, this is readily achieved by thickening the bulb walls in a region intermediate the neck-bulb junctures. A lens effect is thereby obtained which increases the flux density in a direction other than along the axis of the lamp. Thickening of the bulb wall in a selected region is obtained by increasing the degree of upset and this in general requires a greater rate of displacement of the tailstock for a given rate of displacement of the burner. FIGS. 9 to 11 illustrate various bulb configurations according to this aspect of the invention.

In FIG. 9, the wall thickness of bulb 39 is increased in the equatorial zone in a symmetrical pattern. This configuration is particularly useful where a circular distribution of light is desired, as where the lamp is to be mounted with its axis vertical to give a light beam concentrated about the horizon all around.

The bulb configuration illustrated at 40 in FIG. 10 causes the flux density to increase towards the right and to diminish towards the left, that is the flux is concentrated in a region between the equator and the right pole. This shape is well adapted to use in parabolic reflectors where the lamp is mounted with its axis on the polar axis of the reflector. This bulb cross section may be achieved by increasing the rate of upset in the first stage of bulb formation to give the steep left edge of the bulb while reducing it in the later stage to give the gradually sloping right side of the bulb.

The bulb configuration illustrated at 41 in FIG. 11 utilizes the lens effect of the thickened lower side of the quartz wall of the bulb to increase the radiant flux density on the downward side. This shape is suitable for use in optical projection systems wherein the lamp is mounted with its axis perpendicular to the axis of a parabolic or elliptical reflector. This particular cross section is achieved by periodically stopping the rotation of the bulb in the glass lathe and allowing it to sag while being upset.

The foregoing description of a specific technique followed in processing quartz tubing into bulbs in accordance with the invention is intended by way of illustrative example only. Likewise the various bulb configurations which have been illustrated and specifically described are examples of the variety which is made possible. It is intended by the appended claims to cover any modifications falling within the true spirit and scope of the invention.

What I claim as new and desire to secure by Letters Patent of the United States is:

1. A one-piece quartz envelope for an electric lamp comprising a pair of relatively thin-walled opposed neck portions of quartz tubing merging through constricted throats into a relatively thick-walled central bulb portion, the walls of said bulb portion consisting of a build-up of quartz resulting from the controlled necking and upset of tubing corresponding to the neck portions.

2. A one-piece quartz envelope for an electric lamp comprising a pair of relatively thin-walled diametrically opposed neck portions of quartz tubing merging through constricted throats into a relatively thick-walled central bulb portion, the walls of said bulb portion consisting of a build-up of quartz resulting from the controlled necking and upset of tubing corresponding to the neck portions, the quartz of said bulb portion being improved in that any gases trapped therein are in the form of bubbles rather than streamers.

3. A one-piece quartz envelope for an electric lamp comprising a pair of relatively thin-walled diametrically opposed neck portions of quartz tubing merging through constricted throats into a relatively thick-walled central bulb portion, the walls of said bulb portion consisting of a build-up of quartz resulting from the controlled necking and upset of tubing corresponding to the neck portions, the bulb walls being thickened in a region intermediate the neck-bulb junctures in order to increase by lens effect the radiation in a non-axial direction.

4. The method of making a one-piece quartz envelope for an electric lamp which comprises:
heat-softening a short section of relatively thin-walled quartz tubing such that it necks down to form a throat;
heat-softening a short section adjacent to the throat in order to make it tend to neck down and pressing the ends of the tubing together in order to upset the quartz at the heat-softened section and make the wall thicken and expand radially outward at said section;
displacing the region of heat-softening along the tubing while continuing to press the tubing into it in order to build up a relatively thick-walled bulb portion;
and heat-softening a section beyond the bulb portion such that it necks down to form a throat;
whereby a thick-walled bulb portion results separated from thin-walled neck portions by constricted throats.

5. The method defined in claim 4 wherein the quartz tubing is gripped by its ends and spun on its longitudinal axis while heat-softening takes place.

6. The method defined in claim 4 wherein the quartz tubing is gripped by its ends and spun on its longitudinal axis while an oxyhydrogen flame is directed against a section of the tubing in order to heat-soften it.

7. The method defined in claim 5 wherein necking down the tubing and pressing it in order to upset the quartz and build up a relatively thick-walled bulb portion is performed simultaneously.

References Cited by the Examiner
UNITED STATES PATENTS

| | | | |
|---|---|---|---|
| 1,948,560 | 2/1934 | Borneman | 65—109 |
| 2,218,254 | 10/1940 | Wengel | 65—110 |

OTHER REFERENCES

"The Methods of Glass Blowing," third edition, by W. A. Shenstone, 1894, pages 34, 35, 36, 47, and 48.

DONALL H. SYLVESTER, *Primary Examiner.*

A. D. KELLOGG, *Assistant Examiner.*